United States Patent
Bajoria et al.

(10) Patent No.: US 6,910,160 B2
(45) Date of Patent: Jun. 21, 2005

(54) SYSTEM, METHOD, AND COMPUTER PROGRAM PRODUCT FOR PRESERVING TRACE DATA AFTER PARTITION CRASH IN LOGICALLY PARTITIONED SYSTEMS

(75) Inventors: Aditi Bajoria, Austin, TX (US); Gordon D. McIntosh, Austin, TX (US); Kanisha Patel, Cedar Park, TX (US); Gary Lee Ruzek, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 568 days.

(21) Appl. No.: 10/045,281

(22) Filed: Jan. 10, 2002

(65) Prior Publication Data

US 2003/0131039 A1 Jul. 10, 2003

(51) Int. Cl.⁷ .................................................. G06F 11/00
(52) U.S. Cl. ................................................ 714/45; 714/37
(58) Field of Search ............................ 714/45, 37, 38

(56) References Cited

U.S. PATENT DOCUMENTS

| | | | | |
|---|---|---|---|---|
| 6,493,837 B1 * | 12/2002 | Pang et al. | ............ | 714/45 |
| 6,543,010 B1 * | 4/2003 | Gaudet et al. | ............ | 714/45 |
| 6,658,591 B1 * | 12/2003 | Arndt | ............ | 714/6 |
| 6,711,700 B2 * | 3/2004 | Armstrong et al. | ............ | 714/23 |
| 6,842,870 B2 * | 1/2005 | Austen et al. | ............ | 714/48 |
| 2002/0198983 A1 * | 12/2002 | Ullmann et al. | ............ | 709/224 |
| 2003/0056155 A1 * | 3/2003 | Austen et al. | ............ | 714/45 |

OTHER PUBLICATIONS

Microsoft Computer Dictionary, Fourth Edition; Microsoft Press; 1999; p. 173.*

* cited by examiner

*Primary Examiner*—Scott Baderman
*Assistant Examiner*—Joshua Lohn
(74) *Attorney, Agent, or Firm*—Duke W. Yee; Mark E. McBurney; Lisa L. B. Yociss (57) ABSTRACT

A system, method, and product in a logically partitioned data processing system are disclosed for preserving trace data after a partition crash. The logically partitioned data processing system includes multiple, different processors. An error is encountered in one of the processors. Data associated with the error is stored in a trace buffer. Contents of the trace buffer are stored prior to the data being overwritten.

39 Claims, 4 Drawing Sheets

SYSTEM, METHOD, AND COMPUTER PROGRAM PRODUCT FOR PRESERVING TRACE DATA AFTER PARTITION CRASH IN LOGICALLY PARTITIONED SYSTEMS

BACKGROUND OF THE INVENTION

1. Technical Field

The present invention relates generally to the field of computer systems and, more specifically to a data processing system, method, and product in a logically partitioned system for preserving trace data after a partition crash.

2. Description of Related Art

A logical partitioning option (LPAR) within a data processing system (platform) allows multiple copies of a single operating system (OS) or multiple heterogeneous operating systems to be simultaneously run on a single data processing system hardware platform. A partition, within which an operating system image runs, is assigned a non-overlapping subset of the platform's hardware resources. These platform allocable resources include one or more architecturally distinct processors with their interrupt management area, regions of system memory, and input/output (I/O) adapter bus slots. The partition's resources are represented by its own open firmware device tree to the OS image.

Each distinct OS or image of an OS running within the platform is protected from each other such that software errors on one logical partition can not affect the correct operation of any of the other partitions. This is provided by allocating a disjoint set of platform resources to be directly managed by each OS image and by providing mechanisms for ensuring that the various images can not control any resources that have not been allocated to it. Furthermore, software errors in the control of an operating system's allocated resources are prevented from affecting the resources of any other image. Thus, each image of the OS (or each different OS) directly controls a distinct set of allocable resources within the platform.

Many logically partitioned systems make use of a hypervisor. A hypervisor is a layer of privileged software between the hardware and logical partitions that manages and enforces partition protection boundaries. The hypervisor is also referred to as partition management firmware. The hypervisor is responsible for configuring, servicing, and running multiple logical systems on the same physical hardware. The hypervisor is typically responsible for allocating resources to a partition, installing an operating system in a partition, starting and stopping the operating system in a partition, dumping main storage of a partition, communicating between partitions, and providing other functions. In order to implement these functions, a hypervisor also has to implement its own low level operations like main storage management, synchronization primitives, I/O facilities, heap management, and other functions.

Typically the hypervisor includes a trace buffer. A trace facility routine executes within hypervisor. The trace facility writes trace data into trace buffer. This single trace buffer is used for all partitions in the logically partitioned system to record trace data. The trace buffer is of a limited size. Therefore, the data continues to be overwritten by new trace data.

When an error occurs within the logically partitioned system, an exception handler routine writes trace data related to the error to the trace facility. This trace data may be very important to have when evaluating the cause and/or effect of the error. Because a single trace buffer is used to record all trace data associated with each partition, a small delay in the retrieval of the current trace data in the buffer will result in the data being lost because it is constantly being overwritten. Thus, the data related to the error will be overwritten if not retrieved quickly after the occurrence of the error.

Therefore, a need exists for a method, system, and product in a logically partitioned system for preserving trace data after a partition crash.

SUMMARY OF THE INVENTION

A system, method, and product in a logically partitioned data processing system are disclosed for preserving trace data after a partition crash. The logically partitioned data processing system includes multiple, different processors. An error is encountered in one of the processors. Data associated with the error is stored in a trace buffer. Contents of the trace buffer are stored prior to the data being overwritten.

The above as well as additional objectives, features, and advantages of the present invention will become apparent in the following detailed written description.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

A preferred embodiment of the present invention and its advantages are better understood by referring to the figures, like numerals being used for like and corresponding parts of the accompanying figures.

The present invention is a system, method, and computer program product in a logically partitioned data processing system which includes multiple processors for preserving trace data after a partition crash. The logically partitioned data processing system includes an exception handler routine and a trace facility. An unrecoverable error is encountered in one of the processors resulting in the crash of that processor's partition. The exception handler routine begins servicing the error. During the servicing, the exception handler routine transmits error data to the trace facility to be stored in a trace buffer. The error data is associated with the error. The exception handler routine includes with the error data a keyword, also called hereinafter a special hookword. The exception handler routine then completes the servicing of the error and reboots the partition.

The trace facility continuously receives trace data and writes it to the trace buffer. When the trace facility receives data, it determines whether a keyword is included in the data. If such a keyword is included, the trace facility copies the contents of the trace buffer to non-volatile memory. The trace facility then resets pointers to a top of the trace buffer so that data to be stored in the trace buffer is stored starting at said top of the trace buffer.

Figure 1:
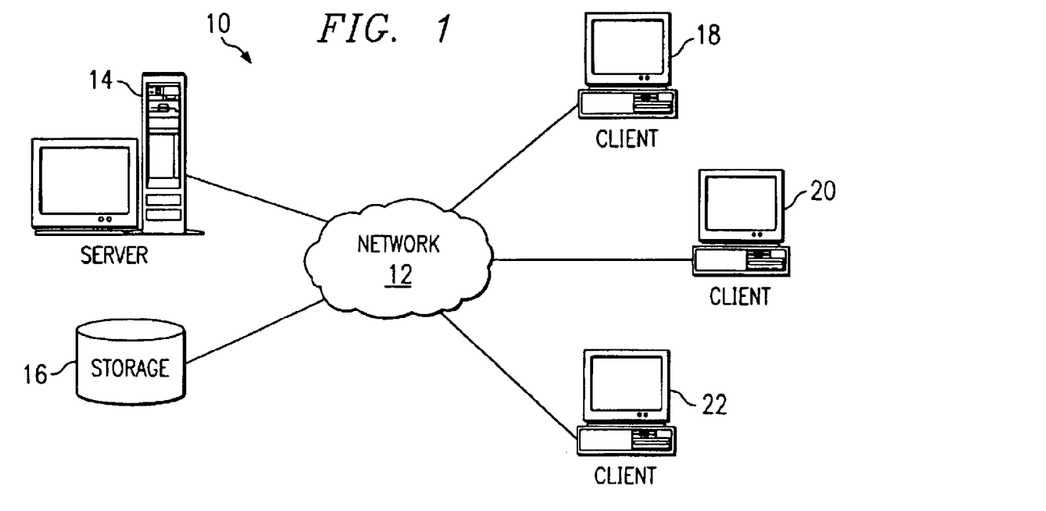
FIG. 1 is a pictorial representation which depicts a data processing system in which the present invention may be implemented in accordance with a preferred embodiment of the present invention.

FIG. 1 depicts a pictorial representation of a network of data processing systems in which the present invention may be implemented. Network data processing system 10 is a network of computers in which the present invention may be implemented. Network data processing system 10 contains a network 12, which is the medium used to provide communications links between various devices and computers connected together within network data processing system 10. Network 12 may include connections, such as wire, wireless communication links, or fiber optic cables.

In the depicted example, a server 14 is connected to network 12 along with storage unit 16. In addition, clients 18, 20, and 22 also are connected to network 12. Network 12 may include permanent connections, such as wire or fiber optic cables, or temporary connections made through telephone connections. The communications network 12 also can include other public and/or private wide area networks, local area networks, wireless networks, data communication networks or connections, intranets, routers, satellite links, microwave links, cellular or telephone networks, radio links, fiber optic transmission lines, ISDN lines, T1 lines, DSL, etc. In some embodiments, a user device may be connected directly to a server 14 without departing from the scope of the present invention. Moreover, as used herein, communications include those enabled by wired or wireless technology.

Clients 18, 20, and 22 may be, for example, personal computers, portable computers, mobile or fixed user stations, workstations, network terminals or servers, cellular telephones, kiosks, dumb terminals, personal digital assistants, two-way pagers, smart phones, information appliances, or network computers. For purposes of this application, a network computer is any computer, coupled to a network, which receives a program or other application from another computer coupled to the network.

In the depicted example, server 14 provides data, such as boot files, operating system images, and applications to clients 18–22. Clients 18, 20, and 22 are clients to server 14. Network data processing system 10 may include additional servers, clients, and other devices not shown. In the depicted example, network data processing system 10 is the Internet with network 12 representing a worldwide collection of networks and gateways that use the TCP/IP suite of protocols to communicate with one another. At the heart of the Internet is a backbone of high-speed data communication lines between major nodes or host computers, consisting of thousands of commercial, government, educational and other computer systems that route data and messages. Of course, network data processing system 10 also may be implemented as a number of different types of networks, such as for example, an intranet, a local area network (LAN), or a wide area network (WAN). FIG. 1 is intended as an example, and not as an architectural limitation for the present invention.

Figure 2:
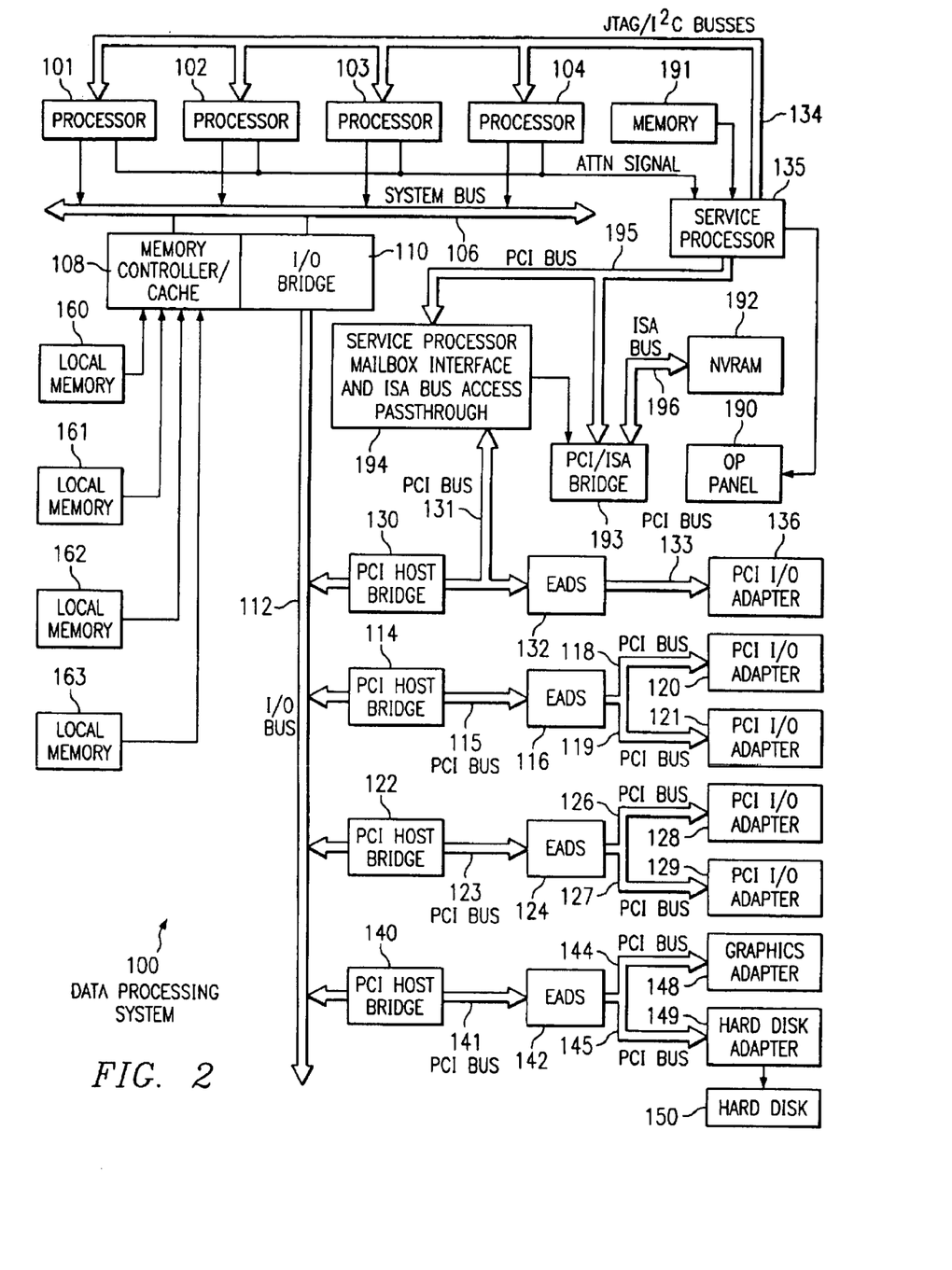
FIG. 2 is a more detailed block diagram of a data processing system in which the present invention may be implemented in accordance with the present invention.

FIG. 2 is a more detailed block diagram of a data processing system in which the present invention may be implemented. Data processing system 100 may be a symmetric multiprocessor (SMP) system including a plurality of processors 101, 102, 103, and 104 connected to system bus 106. For example, data processing system 100 may be an IBM RS/6000, a product of International Business Machines Corporation in Armonk, N.Y., implemented as a server within a network. Alternatively, a single processor system may be employed. Also connected to system bus 106 is memory controller/cache 108, which provides an interface to a plurality of local memories 160–163. I/O bus bridge 110 is connected to system bus 106 and provides an interface to I/O bus 112. Memory controller/cache 108 and I/O bus bridge 110 may be integrated as depicted.

Data processing system 100 is a logically partitioned data processing system. Thus, data processing system 100 may have multiple heterogeneous operating systems (or multiple instances of a single operating system) running simultaneously. Each of these multiple operating systems may have any number of software programs executing within in it. Data processing system 100 is logically partitioned such that different I/O adapters 120–121, 128–129, 136, and 148–149 may be assigned to different logical partitions.

Thus, for example, suppose data processing system 100 is divided into three logical partitions, P1, P2, and P3. Each of I/O adapters 120–121, 128–129, 136, and 148–149, each of processors 101–104, and each of local memories 160–163 is assigned to one of the three partitions. For example, processor 101, memory 160, and I/O adapters 120, 128, and 129 may be assigned to logical partition P1; processors 102–103, memory 161, and I/O adapters 121 and 136 may be assigned to partition P2; and processor 104, memories 162–163, and I/O adapters 148–149 may be assigned to logical partition P3.

Each operating system executing within data processing system 100 is assigned to a different logical partition. Thus, each operating system executing within data processing system 100 may access only those I/O units that are within its logical partition.

Peripheral component interconnect (PCI) Host bridge 114 connected to I/O bus 112 provides an interface to PCI local bus 115. A number of Input/Output adapters 120–121 may be connected to PCI bus 115. Typical PCI bus implementations will support between four and eight I/O adapters (i.e. expansion slots for add-in connectors). Each I/O Adapter 120–121 provides an interface between data processing system 100 and input/output devices such as, for example, other network computers, which are clients to data processing system 100.

An additional PCI host bridge 122 provide an interface for an additional PCI bus 123. PCI bus 123 is connected to a plurality of PCI I/O adapters 128–129 by a PCI bus 126–127. Thus, additional I/O devices, such as, for example, modems or network adapters may be supported through each of PCI I/O adapters 128–129. In this manner, data processing system 100 allows connections to multiple network computers.

A memory mapped graphics adapter 148 may be connected to I/O bus 112 through PCI Host Bridge 140 and EADS 142 (PCI—PCI bridge) via PCI buses 144 and 145 as depicted. Also, a hard disk 150 may also be connected to I/O bus 112 through PCI Host Bridge 140 and EADS 142 via PCT buses 141 and 145 as depicted.

A PCI host bridge 130 provides an interface for a PCI bus 131 to connect to I/O bus 112. PCI bus 131 connects PCI host bridge 130 to the service processor mailbox interface and ISA bus access pass-through logic 194 and EADS 132. The ISA bus access pass-through logic 194 forwards PCI accesses destined to the PCI/ISA bridge 193. The NV-RAM storage is connected to the ISA bus 196. The Service processor 135 is coupled to the service processor mailbox interface 194 through its local PCI bus 195. Service processor 135 is also connected to processors 101–104 via a plurality of JTAG/I$^2$C buses 134. JTAG/I$^2$C buses 134 are a combination of JTAG/scan busses (see IEEE 1149.1) and Phillips I$^2$C busses. However, alternatively, JTAG/I$^2$C buses 134 may be replaced by only Phillips I$^2$C busses or only JTAG/scan busses. All SP-ATTN signals of the host processors 101, 102, 103, and 104 are connected together to an interrupt input signal of the service processor. The service processor 135 has its own local memory 191, and has access to the hardware op-panel 190.

When data processing system 100 is initially powered up, service processor 135 uses the JTAG/scan buses 134 to interrogate the system (Host) processors 101–104, memory controller 108, and I/O bridge 110. At completion of this step, service processor 135 has an inventory and topology understanding of data processing system 100. Service processor 135 also executes Built-In-Self-Tests (BISTs), Basic Assurance Tests (BATs), and memory tests on all elements found by interrogating the system processors 101–104, memory controller 108, and I/O bridge 110. Any error information for failures detected during the BISTs, BATs, and memory tests are gathered and reported by service processor 135.

If a meaningful/valid configuration of system resources is still possible after taking out the elements found to be faulty during the BISTs, BATS, and memory tests, then data processing system 100 is allowed to proceed to load executable code into local (Host) memories 160–163. Service processor 135 then releases the Host processors 101–104 for execution of the code loaded into Host memory 160–163. While the Host processors 101–104 are executing code from respective operating systems within the data processing system 100, service processor 135 enters a mode of monitoring and reporting errors. The type of items monitored by service processor include, for example, the cooling fan speed and operation, thermal sensors, power supply regulators, and recoverable and non-recoverable errors reported by processors 101–104, memories 160–163, and bus-bridge controller 110.

Service processor 135 is responsible for saving and reporting error information related to all the monitored items in data processing system 100. Service processor 135 also takes action based on the type of errors and defined thresholds. For example, service processor 135 may take note of excessive recoverable errors on a processor's cache memory and decide that this is predictive of a hard failure. Based on this determination, service processor 135 may mark that resource for reconfiguration during the current running session and future Initial Program Loads (IPLs). IPLs are also sometimes referred to as a "boot" or "bootstrap".

Those of ordinary skill in the art will appreciate that the hardware depicted in FIG. 2 may vary. For example, other peripheral devices, such as optical disk drives and the like, also may be used in addition to or in place of the hardware depicted. The depicted example is not meant to imply architectural limitations with respect to the present invention.

Figure 3:
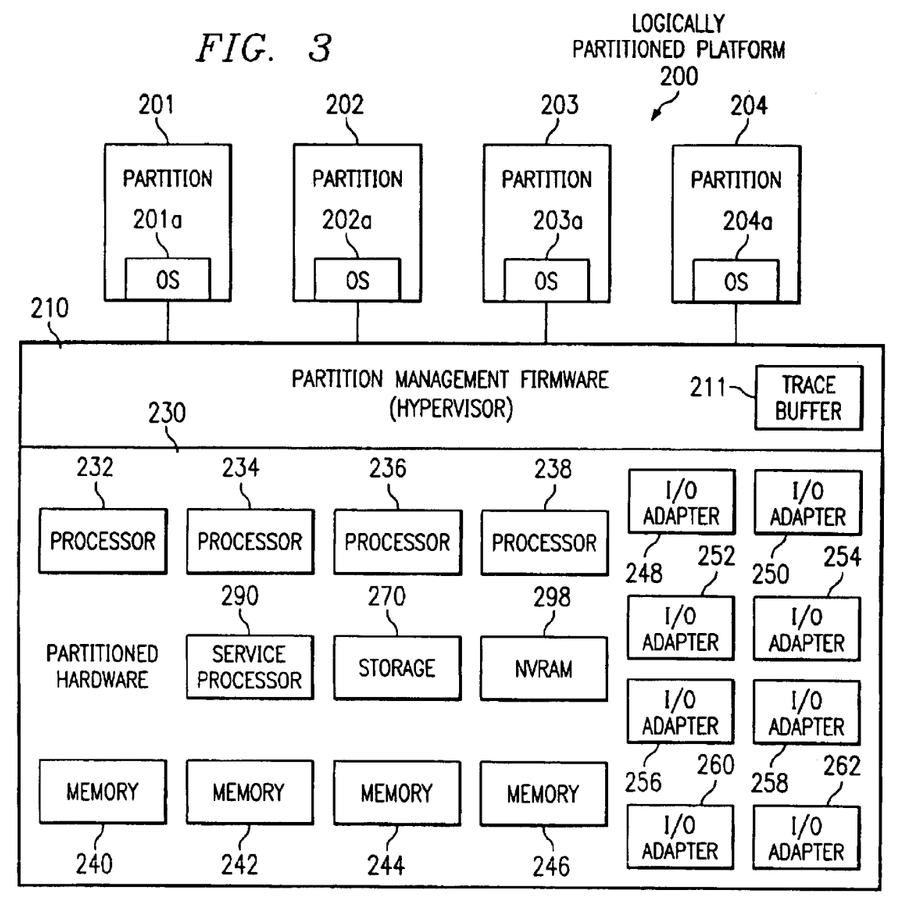
FIG. 3 is a block diagram of an exemplary logically partitioned platform in which the present invention may be implemented.

FIG. 3 is a block diagram of an exemplary logically partitioned platform is depicted in which the present invention may be implemented. Logically partitioned platform 200 includes partitioned hardware 230, partition management firmware 210, also called a hypervisor, and partitions 201–204. Operating systems 201a–204a exist within partitions 201–204. Operating systems 201a–204a may be multiple copies of a single operating system or multiple heterogeneous operating systems simultaneously run on platform 200.

Partitioned hardware 230 includes a plurality of processors 232–238, a plurality of system memory units 240–246, a plurality of input/output (I/O) adapters 248–262, and a storage unit 270. Each of the processors 242–248, memory units 240–246, NV-RAM storage 298, and I/O adapters 248–262 may be assigned to one of multiple partitions 201–204.

Partition management firmware (hypervisor) 210 includes a trace buffer 211. A trace facility routine executes within hypervisor 210. The trace facility writes trace data into trace buffer 211. This single trace buffer 211 is used for all partitions in the logically partitioned system to record hypervisor trace data.

Hypervisor 210 performs a number of functions and services for partitions 201–204 to create and enforce the partitioning of logically partitioned platform 200. Hypervisor 210 is a firmware implemented virtual machine identical to the underlying hardware. Firmware is "software" stored in a memory chip that holds its content without electrical power, such as, for example, read-only memory (ROM), programmable ROM (PROM), erasable programmable ROM (EPROM), electrically erasable programmable ROM (EEPROM), and non-volatile random access memory (non-volatile RAM). Thus, hypervisor 210 allows the simultaneous execution of independent OS images 201a–204a by virtualizing all the hardware resources of logically partitioned platform 200. Hypervisor 210 may attach I/O devices through I/O adapters 248–262 to single virtual machines in an exclusive mode for use by one of OS images 201a–204a.

Figure 4:
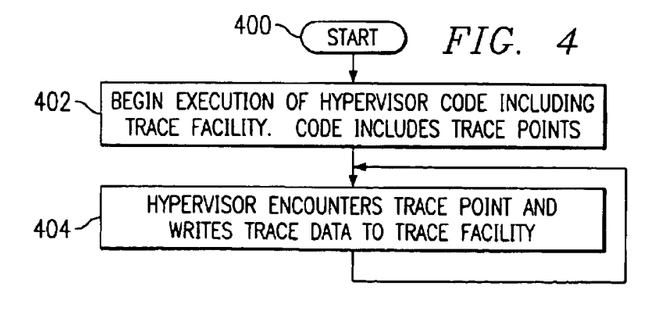
FIG. 4 illustrates a high level flow chart which depicts a hypervisor processing trace data in accordance with the present invention.

FIG. 4 illustrates a high level flow chart which depicts a hypervisor processing trace data in accordance with the present invention. The process starts as depicted by block 400 and thereafter passes to block 402 which illustrates beginning execution of the hypervisor code including the trace facility. The hypervisor code includes trace points already inserted into the code. Next, block 404 illustrates the hypervisor code encountering a trace point, and, in response, writing trace data to the trace facility. The process then passes back to block 404.

Figure 5:
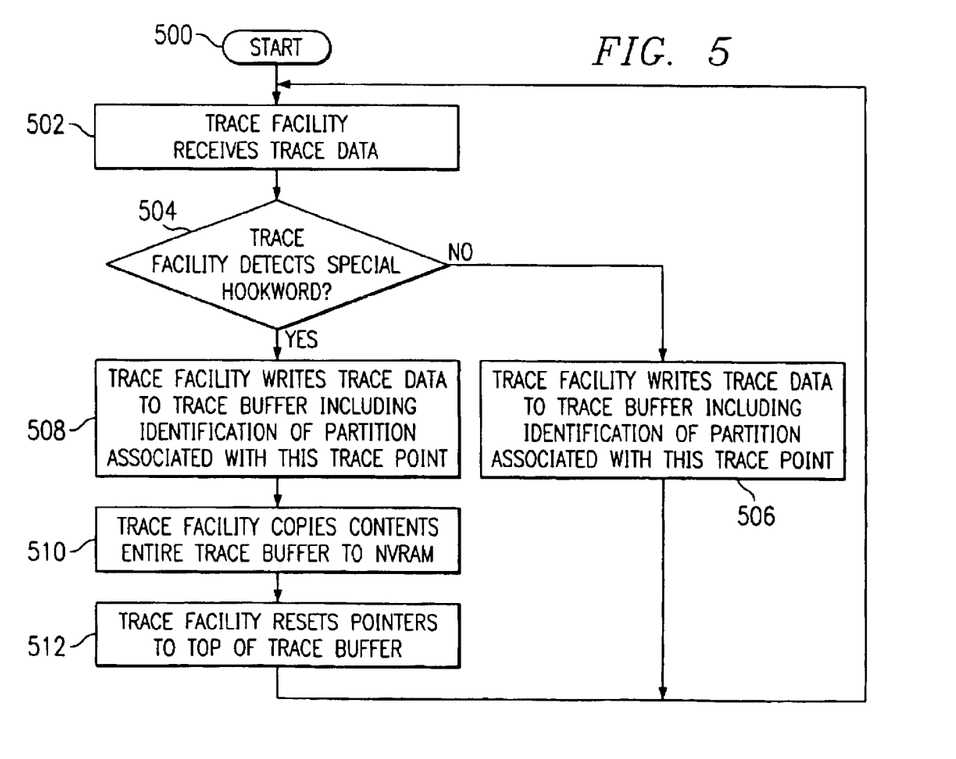
FIG. 5 depicts a high level flow chart which illustrates a trace facility included within a hypervisor copying trace data in response to a partition crash in accordance with the present invention.

FIG. 5 depicts a high level flow chart which illustrates a trace facility included within a hypervisor copying trace data in response to a partition crash in accordance with the present invention. The process starts as depicted by block 500 and thereafter passes to block 502 which illustrates a trace facility receiving trace data. Next, block 504 depicts a determination of whether or not the trace facility detects a special hookword in the trace data. If a determination is made that the trace data does not include a special hookword, the process passes to block 506 which illustrates the trace facility writing the trace data into the trace buffer. The trace data includes an identification of the partition associated with this trace point. The process then passes back to block 502.

Referring again to block 504, if a determination is made that the trace data does include a special hookword, the process passes to block 508 which illustrates the trace facility writing trace data to the trace buffer. The trace data includes an identification of the partition associated with this trace point. Next, block 510 depicts the trace facility copying the contents of the entire trace buffer to non-volatile memory, such as NVRAM 298. Thereafter, block 512 illustrates the trace facility resetting the pointers to the top of the trace buffer. The process then passes to block 502.

Figure 6:
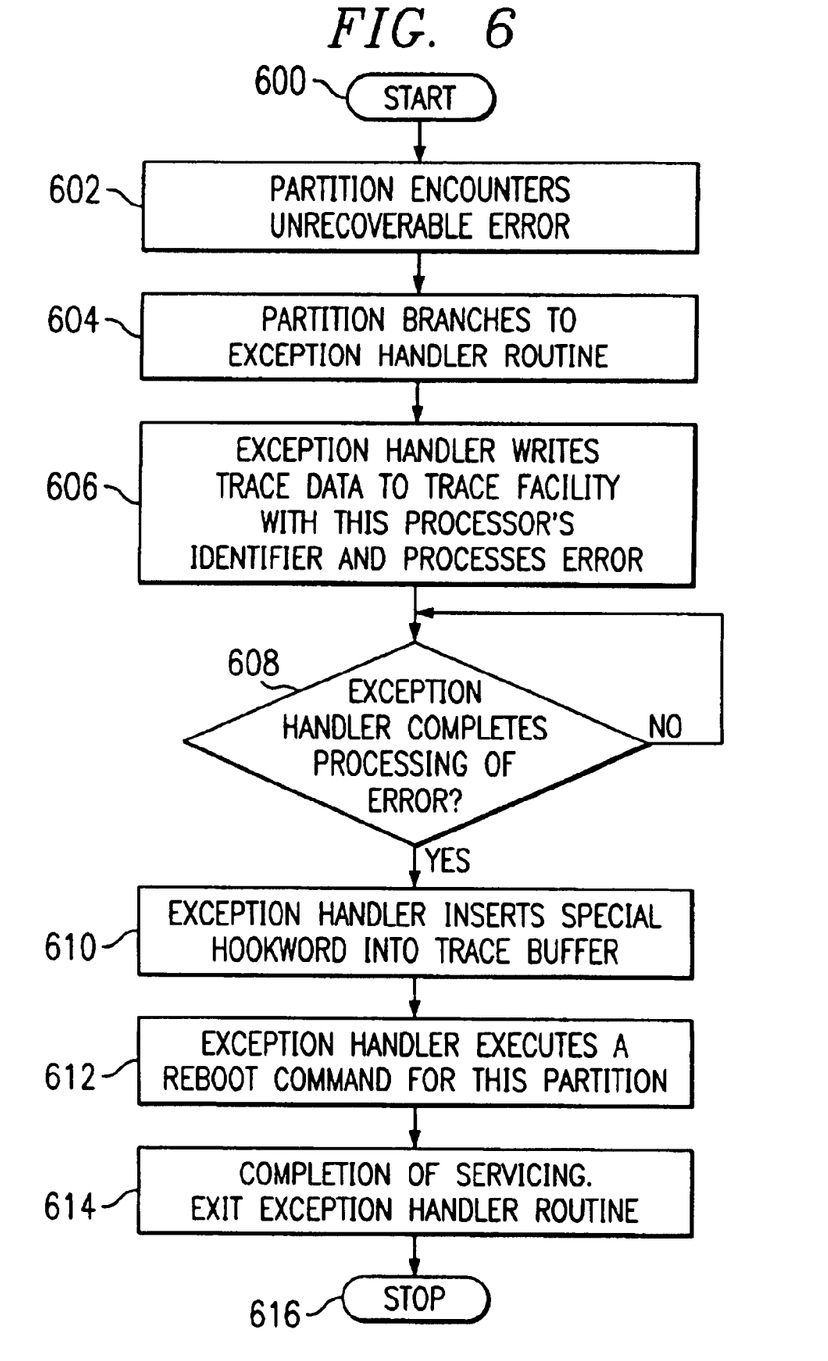
FIG. 6 illustrates a high level flow chart which depicts an exception handler routine recovering from a partition crash in accordance with the present invention.

FIG. 6 illustrates a high level flow chart which depicts an exception handler routine servicing an unrecoverable error in a processor in accordance with the present invention. The process starts as depicted by block 600 and thereafter passes to block 602 which depicts the partition encountering an unrecoverable error. An unrecoverable error is any error that causes the partition to be unable to continue reliable processing. An unrecoverable error may also be called a hard error or fatal error.

Next, block 604 illustrates the partition branching to an exception handler routine. The process then passes to block 606 which depicts the exception handler routine writing trace data about this error to the trace facility with this processor's identifier. The exception handler then processes the error.

Thereafter, block 608 illustrates a determination of whether or not the exception handler has completed processing of the error. If a determination is made that the exception handler has not completed processing the error, the process passes back to block 608. Referring again to block 608, if a determination is made that the exception handler has completed processing the error, the process passes to block 610 which depicts the exception handler routine inserting a special hookword into the trace buffer. The process then passes to block 612 which illustrates the exception handler routine executing a reboot command for this partition. Thereafter, block 614 depicts the completion of the servicing of the error and the exiting of the exception handler routine. The process then terminates as illustrated by block 616.

The following is example pseudo code that may be used in an exception handler routine to implement the present invention:

e_trace (HOOKWORD=FLASH_BUFFER_NOW);
RebootSystem ( );

The following is example pseudo code that may be used in a trace facility to implement the present invention:

if HOOKWORD is FLASH_BUFFER_NOW
then
write trace buffer to NVRAM
reset pointers to start of trace buffer
else
process hookword as normal
endif It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media, such as a floppy disk, a hard disk drive, a RAM, CD-ROMs, DVD-ROMs, and transmission-type media, such as digital and analog communications links, wired or wireless communications links using transmission forms, such as, for example, radio frequency and light wave transmissions. The computer readable media may take the form of coded formats that are decoded for actual use in a particular data processing system.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method in a logically partitioned data processing system for preserving trace data after a partition crash, said logically partitioned data processing system including a plurality of processors and a plurality of partitions, each one of said plurality of partitions executing its own separate operating system, errors from an operating system being executed by one of said plurality of partitions not affecting the operation of operating systems being executed by all others of said plurality of partitions, said method comprising the steps of:

encountering an unrecoverable error in one of said plurality of processors that is assigned to one of said plurality of partitions that results in a crash of said one of said plurality of partitions remaining ones of said plurality of partitions continuing to function after said crash each one of said plurality of processors being assigned to a different one of said plurality of partitions;

storing trace data for all of said partitions in said trace buffer:

continually overwriting data that is already stored in said trace buffer with newly received trace data as said newly received trace data is received within said trace buffer;

storing, in said trace buffer, error data associated with said error; and saving the current contents of said trace buffer prior to said error data being overwritten.

2. The method according to claim 1, further comprising the step of saving said contents of said trace buffer in non-volatile storage prior to said error data being overwritten.

3. The method according to claim 1, further comprising the steps of:

encountering said error, and storing a keyword with said error data in said trace buffer.

4. The method according to claim 3, further comprising the step of saving contents of said trace buffer in response to a detection of said keyword in said contents of said trace buffer.

5. The method according to claim 1, further comprising the steps of:

encountering said error;

servicing said error; and storing a keyword with said error data in said trace buffer during said servicing of said error.

6. The method according to claim 5, further comprising the step of rebooting said one of said plurality of partitions after said storage of said keyword.

7. The method according to claim 1, further comprising the steps of:

providing a trace facility, said trace facility for receiving trace data and writing trace data to said trace buffer; and storing said error data in a trace buffer associated with said error utilizing said trace facility.

8. The method according to claim 1, further comprising the steps of receiving data to be stored in said trace buffer;

determining whether said data includes a keyword; and in response to a determination that said data includes said keyword, copying contents of said trace buffer.

9. The method according to claim 1, further comprising the step of:

providing a trace facility, said trace facility for receiving trace data and writing trace data to said trace buffer;

receiving data, utilizing said trace facility, to be stored in said trace buffer;

determining, utilizing said trace facility, whether said data includes a keyword; and in response to a determination that said data includes said keyword, copying, utilizing said trace facility, contents of said trace buffer.

10. The method according to claim 9, further comprising the set of resetting, utilizing said trace facility, pointers to a top of said trace buffer, wherein data to be stored in said trace buffer is stored starting at said top of said trace buffer.

11. The method according to claim 1, further comprising the steps of:

providing an exception handler routine;

servicing, utilizing said exception handler routine, said error;

during said servicing, transmitting, utilizing said exception handler routine, said error data to a trace facility to be stored in said trace buffer, said error data being associated with said error;

including with said error data, utilizing said exception handler routine, a keyword;

completing, utilizing said exception handler routine, said servicing of said error.

12. The method according to claim 1, further comprising the step of a partition controlled by said one of said plurality of processors crashing in response to said unrecoverable error.

13. A method in a logically partitioned data processing system for preserving trace data after a partition crash, said logically partitioned data processing system including a plurality of processors and a plurality of partitions, each one of said plurality of partitions executing its own separate operating system, errors from an operating system being executed by one of said plurality of partitions not affecting the operation of operating systems being executed by all others of said plurality of partitions, said method comprising the steps of:

providing an exception handler routine;

encountering an unrecoverable error in one of said plurality of processors that is assigned to one of said plurality of partitions that results in a crash of said one of said plurality of partitions, remaining ones of said plurality of partitions continuing to function after said crash, each one of said plurality of processors being assigned to a different one of said plurality of partitions;

servicing, utilizing said exception handler routine, said error;

during said servicing, transmitting, utilizing said exception handler routine, error data to a trace facility to be stored in said trace buffer, said error data being associated with said error;

storing trace data for all of said partitions in said trace buffer;

continually overwriting data that is already stored in said trace buffer with newly received trace data as said newly received trace data is received within said trace buffer;

including with said error data, utilizing said exception handler routine, a keyword;

completing, utilizing said exception handler routine, said servicing of said error;

providing said trace facility, said trace facility for receiving trace data and writing trace data to said trace buffer;

receiving said error data, utilizing said trace facility, to be stored in said trace buffer;

determining, utilizing said trace facility, whether said error data includes a keyword;

in response to a determination that said error data includes said keyword, copying, utilizing said trace facility, contents of said trace buffer; and resetting, utilizing said trace facility, pointers to a top of said trace buffer, wherein data to be stored in said trace buffer is stored starting at said top of said trace buffer.

14. A logically partitioned data processing system for preserving trace data after a partition crash, said logically partitioned data processing system including a plurality of processors and a plurality of partitions, each one of said plurality of partitions executing its own separate operating system, errors from an operating system being executed by one of said plurality of partitions not affecting the operation of operating systems being executed by all others of said plurality of partitions comprising:

means for encountering an unrecoverable error in one of said plurality of processors that is assigned to one of said plurality of partitions that results in a crash of said one of said plurality of partitions, remaining ones of said plurality of partitions continuing to function after said crash, each one of said plurality of processors being assigned to a different one of said plurality of partitions;

means for storing trace data for all of said partitions in said trace buffer;

means for continually overwriting data that is already stored in said trace buffer with newly received trace data as said newly received trace data is received within said trace buffer;

means for storing error data in a trace buffer associated with said error; and means for saving the current contents of said trace buffer prior to said error data being overwritten.

15. The system according to claim 14, further comprising means for storing said contents of said trace buffer in non-volatile storage prior to said error data being overwritten.

16. The system according to claim 14, further comprising:

means for encountering said error; and means for storing a keyword with said error data in said trace buffer.

17. The system according to claim 16, further comprising means for saving contents of said trace buffer in response to a detection of said keyword in said contents of said trace buffer.

18. The system according to claim 14, further comprising:
means for encountering said error;
means for servicing said error; and
means for storing a keyword with said error data in said trace buffer during said servicing of said error.

19. The system according to claim 18, further comprising means for rebooting said one of said plurality of partitions after said storage of said keyword.

20. The system according to claim 14, further comprising:
means for providing a trace facility, said trace facility for receiving trace data and writing trace data to said trace buffer; and
means for storing said error data in a trace buffer associated with said error utilizing said trace facility.

21. The system according to claim 14, further comprising:
means for receiving data to be stored in said trace buffer;
means for determining whether said data includes a keyword; and
in response to a determination that said data includes said keyword, means for copying contents of said trace buffer.

22. The system according to claim 14, further comprising:
means for providing a trace facility, said trace facility for receiving trace data and writing trace data to said trace buffer;
means for receiving data, utilizing said trace facility, to be stored in said trace buffer;
means for determining, utilizing said trace facility, whether said data includes a keyword; and
in response to a determination that said data includes said keyword, means for copying, utilizing said trace facility, contents of said trace buffer.

23. The system according to claim 22, further comprising means for resetting, utilizing said trace facility, pointers to a top of said trace buffer, wherein data to be stored in said truce buffer is stored starting at said top of said trace buffer.

24. The system according to claim 14, further comprising:
means for providing an exception handler routine;
means for servicing, utilizing said exception handler routine, said error;
means for during said servicing, transmitting, utilizing said exception handler routine, said error data to a trace facility to be stored in said trace buffer, said error data being associated with said error;
means for including with said error data, utilizing said exception handler routine, a keyword;
means for completing, utilizing said exception handler routine, said servicing of said error.

25. The system according to claim 14, further comprising means for a partition controlled by said one of said plurality of processors crashing in response to said unrecoverable error.

26. A logically partitioned data processing system for preserving trace data after a partition crash, said logically partitioned data processing system including a plurality of processors and a plurality of partitions, each one of said plurality of partitions executing it own separate operating system, errors from an operating system being executed by one of said plurality of partitions not affecting the operation of operating systems being executing by all others of said plurality of partitions, comprising:
means for providing an exception handler routine;
means for encountering an unrecoverable error in one of said plurality of processors that is assigned to one of said plurality of partitions that result in a crash of said one of said plurality of partitions, remaining ones of said plurality of partitions continuing to function after said crash, each one of said plurality of processors being assigned to a different one of said plurality of partitions;
means for servicing, utilizing said exception handler routine, said error;
means for during said servicing, transmitting, utilizing said exception handler routine, error data to a trace facility to be stored in said trace buffer, said error data being associated with said error;
means for storing trace data for all of said partitions in said trace buffer;
means for continually overwriting data that is already stored in said trace buffer with newly received trace data as said newly received trace data is received within said trace buffer;
means for including with said error data, utilizing said exception handler routine, a keyword;
means for completing, utilizing said exception handler routine, said servicing of said error;
means for providing said trace facility, said trace facility for receiving trace data and writing trace data to said trace buffer;
means for receiving said error data, utilizing said trace facility, to be stored in said trace buffer;
means for determining, utilizing said trace facility, whether said error data includes a keyword;
in response to a determination that said error data includes said keyword, means for copying, utilizing said trace facility, contents of said trace buffer; and
means for resetting, utilizing said trace facility, pointers to a top of said trace buffer, wherein data to be stored in said trace buffer is stored starting at said top of said trace buffer.

27. A computer program product in a logically partitioned data processing system for preserving trace data after a partition crash, said logically partitioned data processing system including a plurality of processors and a plurality of partitions, each one of said plurality of partitions executing its own separate operating system, errors from an operating system being executed by one of said plurality of partitions not affecting the operation of operating systems being executed by all others of said plurality of partitions, said product comprising:
instruction means for encountering an unrecoverable error in one of said plurality of processors that is assigned to one of said plurality of partitions that results in a crash of said one of said plurality of partitions remaining ones of said plurality of partitions continuing to function after said crash, each one of said plurality of processors being assigned to a different one of said plurality of partitions;
instruction means for storing trace data for all of said partitions in said trace buffer;
instruction means for continually overwriting data that is already stored in said trace buffer with newly received trace data as said newly received trace data is received within said trace buffer;
instruction means for storing error data in a trace buffer associated with said error; and
instruction means for saving the current contents of said trace buffer prior to said error data being overwritten.

28. The product according to claim further 27, comprising instruction means for saving storing said contents of said trace buffer in non-volatile storage prior to said error data being overwritten.

29. The product according to claim 27, further comprising:
   instruction means for encountering said error; and
   instruction means for storing a keyword with said error data in said trace buffer.

30. The product according to claim 29, further comprising instruction means for saving contents of said trace buffer in response to a detection of said keyword in said contents of said trace buffer.

31. The product according to claim 27, further comprising:
   instruction means for encountering said error;
   instruction means for servicing said error; and
   instruction means for storing a keyword with said error data in said trace buffer during said servicing of said error.

32. The product according to claim 31, further comprising instruction means for rebooting said one of said plurality of partitions after said storage of said keyword.

33. The product according to claim 27, further comprising:
   instruction means for providing a trace facility, said trace facility for receiving trace data and writing trace data to said trace buffer; and
   instruction means for storing said error data in a trace buffer associated with said error utilizing said trace facility.

34. The product according to claim 27, further comprising:
   instruction means for receiving data to be stored in said trace buffer;
   instruction means for determining whether said data includes a keyword; and
   in response to a determination that said data includes said keyword, instruction means for copying contents of said trace buffer.

35. The product according to claim 27, further comprising:
   instruction means for providing a trace facility, said trace facility for receiving trace data and writing trace data to said trace buffer;
   instruction means for receiving data, utilizing said trace facility, to be stored in said trace buffer;
   instruction means for determining, utilizing said trace facility, whether said data includes a keyword; and
   in response to a determination that said data includes said keyword, instruction means for copying, utilizing said trace facility, contents of said trace buffer.

36. The product according to claim 35, further comprising instruction means for resetting, utilizing said trace facility, pointers to a top of said trace buffer, wherein data to be stored in said trace buffer is stored starting at said top of said trace buffer.

37. The product according to claim 36, further comprising:
   instruction means for providing an exception handler routine;
   instruction means for servicing, utilizing said exception handler routine, said error;
   during said servicing, instruction means for transmitting, utilizing said exception handler routine, said error data to a trace facility to be stored in said trace buffer, said error data being associated with said error;
   instruction means for including with said error data, utilizing said exception handler routine, a keyword;
   instruction means for completing, utilizing said exception handler routine, said servicing of said error.

38. The product according to claim 27, further comprising instruction means for a partition controlled by said one of said plurality of processors crashing in response to said unrecoverable error.

39. A computer program product in a logically partitioned data processing system for preserving trace data after a partition crash, said logically partitioned data processing system including a plurality of processors and a plurality of partitions, each one of said plurality of partitions executing its own separate operating system, errors from an operating system being executed by one of said plurality of partitions not affecting the operation of operating systems being executed by all others of said plurality of partitions, said product comprising:
   instruction means for providing an exception handler routine;
   instruction means for encountering an unrecoverable error in one of said plurality of processors that is assigned to one of said plurality of partitions that results in a crash of said one of said plurality of partitions, remaining ones of said plurality of partitions continuing to function after said crash, each one of said plurality of processors being assigned to a different one of said plurality of partitions;
   instruction means for servicing, utilizing said exception handler routine, said error;
   during said servicing, instruction means for transmitting, utilizing said exception handler routine, error data to a trace facility to be stored in said trace buffer, said error data being associated with said error;
   instruction means for storing trace data for all of said partitions in said trace buffer;
   instruction means for continually overwriting data that is already stored in said trace buffer with newly received trace data as said newly received trace data is received within said trace buffer;
   instruction means for including with said error data, utilizing said exception handler routine, a keyword;
   instruction means for completing, utilizing said exception handler routine, said servicing of said error;
   instruction means for providing said trace facility, said trace facility for receiving trace data and writing trace data to said trace buffer;
   instruction means for receiving said error data, utilizing said trace facility, to be stored in said trace buffer;
   instruction means for determining, utilizing said trace facility, whether said error data includes a keyword;
   in response to a determination that said error data includes said keyword, instruction means for copying, utilizing said trace facility, contents of said trace buffer; and
   instruction means for resetting, utilizing said trace facility, pointers to a top of said trace buffer, wherein data to be stored in said trace buffer is stored starting at said top of said trace buffer.

* * * * *